(12) United States Patent
Senarath et al.

(10) Patent No.: US 10,700,936 B2
(45) Date of Patent: Jun. 30, 2020

(54) SYSTEM AND METHODS FOR VIRTUAL INFRASTRUCTURE MANAGEMENT BETWEEN OPERATOR NETWORKS

(71) Applicants: Nimal Gamini Senarath, Ottawa (CA); Sophie Vrzic, Kanata (CA); Jaya Rao, Ottawa (CA)

(72) Inventors: Nimal Gamini Senarath, Ottawa (CA); Sophie Vrzic, Kanata (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 15/168,514

(22) Filed: May 31, 2016

(65) Prior Publication Data

US 2016/0359682 A1    Dec. 8, 2016

Related U.S. Application Data

(60) Provisional application No. 62/221,297, filed on Sep. 21, 2015, provisional application No. 62/170,051, filed on Jun. 2, 2015.

(51) Int. Cl.
*H04L 12/24*    (2006.01)
*H04W 16/14*    (2009.01)

(52) U.S. Cl.
CPC ......... *H04L 41/0896* (2013.01); *H04W 16/14* (2013.01)

(58) Field of Classification Search
CPC ...... H04L 41/00–41/5096; H04L 16/00–16/32
See application file for complete search history.

(56) References Cited

U.S. PATENT DOCUMENTS

| | | | |
|---|---|---|---|
| 6,842,783 B1 | 1/2005 | Boivie et al. | |
| 7,925,756 B1 | 4/2011 | Riddle | |
| 9,392,471 B1 | 7/2016 | Thomas et al. | |
| 10,129,894 B2 | 11/2018 | Farmanbar et al. | |
| 2003/0103510 A1 | 6/2003 | Svanberg et al. | |
| 2003/0117954 A1 | 6/2003 | De Neve et al. | |
| 2003/0177221 A1 | 9/2003 | Ould-Brahim et al. | |
| 2004/0146036 A1 | 7/2004 | Parantainen et al. | |
| 2004/0203973 A1 | 10/2004 | Khan | |
| 2006/0085544 A1 | 4/2006 | Chen et al. | |

(Continued)

FOREIGN PATENT DOCUMENTS

| | | |
|---|---|---|
| CA | 2874463 C | 5/2019 |
| CN | 101166181 A | 4/2008 |

(Continued)

OTHER PUBLICATIONS

3GPP TR 22.891 entitled "Study on New Services and Markets Technology Enablers".

(Continued)

*Primary Examiner* — Clayton R Williams

(57) ABSTRACT

There is provided a system and method for virtual infrastructure management and in some embodiments for virtual infrastructure management between operator networks. According to embodiments, there is provided a system and a method for the requesting and provisioning of network resources including infrastructure resources, spectrum resources or both, between network operators.

27 Claims, 7 Drawing Sheets

(56) References Cited

U.S. PATENT DOCUMENTS

| | | |
|---|---|---|
| 2007/0297367 A1 | 12/2007 | Wang et al. |
| 2008/0130519 A1 | 6/2008 | Bahl et al. |
| 2009/0191888 A1 | 7/2009 | Abedi |
| 2010/0046531 A1 | 2/2010 | Louati et al. |
| 2010/0069081 A1 | 3/2010 | Mitra et al. |
| 2010/0122141 A1 | 5/2010 | Arye |
| 2010/0216404 A1 | 8/2010 | Hershey et al. |
| 2011/0125905 A1 | 5/2011 | Baucke et al. |
| 2011/0283017 A1 | 11/2011 | Alkhatib et al. |
| 2012/0120887 A1 | 5/2012 | Deaton et al. |
| 2012/0233302 A1 | 9/2012 | Kallin et al. |
| 2013/0007232 A1 | 1/2013 | Wang et al. |
| 2013/0143574 A1 | 6/2013 | Teyeb et al. |
| 2013/0182601 A1 | 7/2013 | Bandyopadhyay et al. |
| 2013/0183991 A1 | 7/2013 | Bosch et al. |
| 2013/0201847 A1 | 8/2013 | Chincholi et al. |
| 2013/0212285 A1 | 8/2013 | Hoffmann et al. |
| 2013/0225123 A1 | 8/2013 | Adjakple et al. |
| 2013/0295946 A1* | 11/2013 | Panchal ............. H04W 16/14 455/452.1 |
| 2014/0086177 A1 | 3/2014 | Adjakple et al. |
| 2014/0086194 A1 | 3/2014 | Sugahara |
| 2014/0115578 A1 | 4/2014 | Cooper et al. |
| 2014/0215466 A1 | 7/2014 | Khasnabish |
| 2014/0244808 A1 | 8/2014 | Axelrod et al. |
| 2014/0269295 A1 | 9/2014 | Anumala |
| 2014/0282769 A1 | 9/2014 | Salem et al. |
| 2014/0301192 A1 | 10/2014 | Lee et al. |
| 2014/0317261 A1 | 10/2014 | Shatzkamer et al. |
| 2014/0376555 A1 | 12/2014 | Choi et al. |
| 2015/0011234 A1 | 1/2015 | Wei et al. |
| 2015/0043382 A1 | 2/2015 | Arora et al. |
| 2015/0063112 A1 | 3/2015 | Wu et al. |
| 2015/0100694 A1* | 4/2015 | Sohail ............. H04L 47/6265 709/226 |
| 2015/0104172 A1 | 4/2015 | Wang et al. |
| 2015/0154258 A1 | 6/2015 | Xiong et al. |
| 2015/0173111 A1 | 6/2015 | Agarwal et al. |
| 2015/0288541 A1 | 10/2015 | Fargano et al. |
| 2016/0044702 A1 | 2/2016 | Centonza et al. |
| 2016/0328259 A1 | 11/2016 | Xia et al. |
| 2016/0352528 A1 | 12/2016 | Law et al. |
| 2017/0079059 A1 | 3/2017 | Li et al. |
| 2017/0104609 A1 | 4/2017 | McNamee et al. |
| 2017/0126492 A1 | 5/2017 | Seligson et al. |
| 2017/0127427 A1 | 5/2017 | Claridge et al. |
| 2017/0208019 A1 | 7/2017 | Shimojou et al. |
| 2017/0257870 A1 | 9/2017 | Farmanbar |

FOREIGN PATENT DOCUMENTS

| | | |
|---|---|---|
| CN | 102427473 A | 4/2012 |
| CN | 102710508 A | 10/2012 |
| CN | 103052054 | 4/2013 |
| CN | 103052054 A | 4/2013 |
| CN | 103168445 A | 6/2013 |
| CN | 103369535 A | 10/2013 |
| CN | 103548370 A | 1/2014 |
| CN | 104243301 A | 12/2014 |
| CN | 104252390 A | 12/2014 |
| CN | 104270441 A | 1/2015 |
| CN | 104335639 A | 2/2015 |
| EP | 1729532 A1 | 12/2006 |
| EP | 2493235 A1 | 8/2012 |
| EP | 2627140 A1 | 8/2013 |
| EP | 2667541 A1 | 11/2013 |
| EP | 2866495 A2 | 4/2015 |
| GB | 2512900 A | 10/2014 |
| JP | 2009542091 A | 11/2009 |
| JP | 2011508474 A | 3/2011 |
| JP | 2013541289 A | 11/2013 |
| JP | 2014045390 A | 3/2014 |
| JP | 2014090501 A | 5/2014 |
| JP | 2015080204 A | 4/2015 |
| KR | 20130084680 A | 7/2013 |
| WO | 2009071431 A1 | 6/2009 |
| WO | 2011032595 A1 | 3/2011 |
| WO | 2011086250 | 7/2011 |
| WO | 2011144538 A1 | 11/2011 |
| WO | 2013093462 A1 | 6/2013 |
| WO | 2013170045 A2 | 11/2013 |
| WO | 2014086978 A1 | 6/2014 |
| WO | 2014090997 A1 | 6/2014 |
| WO | 2014117135 A2 | 7/2014 |
| WO | 2014121471 A1 | 8/2014 |
| WO | 2014160228 A1 | 10/2014 |
| WO | 2014180513 A1 | 11/2014 |
| WO | 2014197778 A1 | 12/2014 |
| WO | 2015031512 A1 | 3/2015 |
| WO | 2015057960 A1 | 4/2015 |

OTHER PUBLICATIONS

ETSI GS NFV 001 entitled "Network Function Virtualization (NFV); Use Cases", Oct. 2013.
ETSI GS NFV 002 entitled "Network Function Virtualization (NFV); Architectural Framework", Oct. 2013.
International Search Report and Written Opinion for PCT/CN2016/084396, dated Aug. 23, 2016.
International Search Report and Written Opinion for PCT/CN2016/084398, dated Aug. 12, 2016.
English Abstract of CN103052054.
U.S. Appl. No. 15/169,465, filed May 31, 2016 Not yet published.
International Search Report dated Aug. 8, 2016 for corresponding International Application No, PCT/CN2016/084399 filed Jun. 1, 2016.
International Search Report dated Aug. 4, 2016 for corresponding International Application No. PCT/CN2016/084401 filed Jun. 1, 2016.
International Search Report dated Jul. 18, 2016 for corresponding International Application No. PCT/CN2016/084405 filed Jun. 1, 2016.
International Search Report dated Nov. 14, 2016 for corresponding International Application No. PCT/CN2016/099726 filed Sep. 22, 2016.
NGMN 5G Initiative White Paper, A Deliverable by the NGMN Alliance, pp. 1-125, Feb. 17, 2015.
3GPP TR 23.707 V13.0.0 titled Technical Specification Group Services and System Aspects; Architecture Enhancements for Dedicated Core Networks: Stage 2, Dec. 2014.
3GPP TR 22.891 V0.1.0 (Apr. 2015),3rd Generation Partnership Project;Technical Specification Group Services and System Aspects; Feasibility Study on New Services and Markets Technology Enablers; Stage 1(Release 14), total 26 pages.
European Search Report dated Nov. 22, 2017 for corresponding European patent application No. 16802559.1 filed Jun. 1, 2016.
Partial Supplementary European Search Report dated Apr. 19, 2018 for corresponding European Application No. 16802558.3 filed Jun. 1, 2016.
Liang et al., "Wireless Virtualization for Next Generation Mobile Cellular Networks", IEEE Wireless Communications, pp. 61-69, Feb. 1, 2015.
Liang et al., "Wireless Network Virtualization: A Survey, Some Research Issues and Challenges", IEEE Communications Surveys & Tutorials, vol. 17(1), Jan. 1, 2015.
Extended European Search Report dated Mar. 1, 2018 for corresponding European Application No. 16802560.9 filed Jun. 1, 2016.
Hamid Farmanbar et al.,"Traffic Engineering for Software-Defined Radio Access Networks", 2014 IEEE Network Operations and Management Symposium, May 5, 2014.
Extended European Search Report dated Feb. 27, 2018 for corresponding European Application No. 16802562.5 fiied Jan. 6, 2016.
Extended European Search Report dated Mar. 27, 2018 for corresponding European Application No. 16802556.7 filed Jun. 1, 2016.
Takuya Shimojyo, et al., Future Mobile Core Network for Efficient Service Operation, Network Softwarization, 2015 1st IEEE Conference on, Apr. 2015.

(56) References Cited

OTHER PUBLICATIONS

Tsuyoshi Ogura et al.,"A Study on Congestion Avoidance Technology using Multiple Virtual Networks", IEICE technical report, vol. 114 No. 28, May 8, 2014.
ETSI GS NFV 002 V1.2.1 (Dec. 2014),Network Functions Virtualisation (NFV);Architectural Framework,total 21 pages.
Akihiro Nakao,"Virtualization Technology for Building New-Generation Networks",Virtual Node Project,NICT News,Jun. 30, 2010,total 12 pages.

* cited by examiner

SYSTEM AND METHODS FOR VIRTUAL INFRASTRUCTURE MANAGEMENT BETWEEN OPERATOR NETWORKS

CROSS-REFERENCE TO RELATED APPLICATIONS

This application claims the benefit and priority of U.S. Provisional Applications 62/170,051 and 62/221,297, filed Jun. 2, 2015 and Sep. 21, 2015, respectively. The foregoing applications are incorporated by reference herein in their entirety.

FIELD OF THE INVENTION

The present invention pertains to the field of communications networks, and in particular to a system and method for virtual infrastructure management between operator networks.

BACKGROUND

Managing competing demands from different use case needs makes network planning and deployment difficult.

In building advanced networks, such as those to support future developments in wireless networks (including next generation wireless, or so-called Fifth Generation (5G) networks), network slicing provides the ability to create isolated virtual networks over which different traffic flows can travel. As a result of that we turn to technologies like Network Function Virtualization, Software Defined Networking, and the like, which allow the creation of different network slices. Using SDN and NFV we can create slices and populate them with the required functions. Each of these slices can have the properties required by the traffic flows they serve. This allows one network slice to have low latency and another network slice to be ultra-reliable.

For example, network operators may have limited resources to service customer demands over a shared network infrastructure. This problem becomes exacerbated with increasing customer demands and different network operators operating on the same infrastructure. Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present invention provides a system and methods for virtual infrastructure management. In accordance with embodiments of the present invention, there is provided a method for managing network resources between a first communication network associated with a first network domain and a second communication network associated with a second network domain. The method includes receiving, at a resource broker in the first network domain, a request for additional network resources and transmitting, to a resource broker in a second network domain, a request for additional network resources. The method further includes receiving, in response to the transmitted request, an offer for at least some of the requested additional network resources.

In some embodiments, the method further includes receiving an approval of use of at least some of the requested network resources and may also include allocating the at least some of the requested network resources.

In some embodiments, the method further includes negotiating, by the resource broker of the first network domain, with the resource broker of the second network domain for provision of at least some of the requested additional network resources.

In accordance with embodiments of the present invention, there is provided a method for managing network resources between a first communication network associated with a first network domain and a second communication network associated with a second network domain. The method includes receiving, at a resource broker of the second domain, a request for additional network resources and transmitting, by the resource broker of the second network domain, an inquiry to determine availability of network resources. The method further includes receiving an indication of the availability of network resources and transmitting, in response to the received request, an offer for at least some of the requested additional network resources.

In some embodiments, the method further includes transmitting an approval of use of at least some of the requested network resources.

In some embodiments, the method further includes negotiating, by the resource broker of the second network domain, with the resource broker of the first network domain for provision of at least some of the requested additional network resources.

In accordance with embodiments of the present invention, there is provided a system for managing network resources between a first communication network associated with a first network domain and a second communication network associated with a second network domain. The system includes a first broker/negotiator configured to transmit a request for additional network resources, the first broker/negotiator operatively connected with the first communication network. The system further includes a second broker/negotiator configured to receive and act upon the request from the first broker/negotiator to provision at least some of the requested additional network resources. The second broker/negotiator is operatively connected with the second communication network and the at least some network resources associated the second communication network.

In some embodiments, the first broker/negotiator or the second broker/negotiator or both are instantiated within an Orchestrator associated with the first communication network.

In some embodiments, the first broker/negotiator is instantiated outside of an Orchestrator associated with the first communication network and a Virtual Network Function Manager (VNFM) may be instantiated outside of the Orchestrator and communicatively coupled with a VNFM of a Management and Orchestration (MANO) entity operative on the first communication network.

In some embodiments, the first broker/negotiator and the second broker/negotiator are configured to negotiate the provision of at least some of the requested additional network resources.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
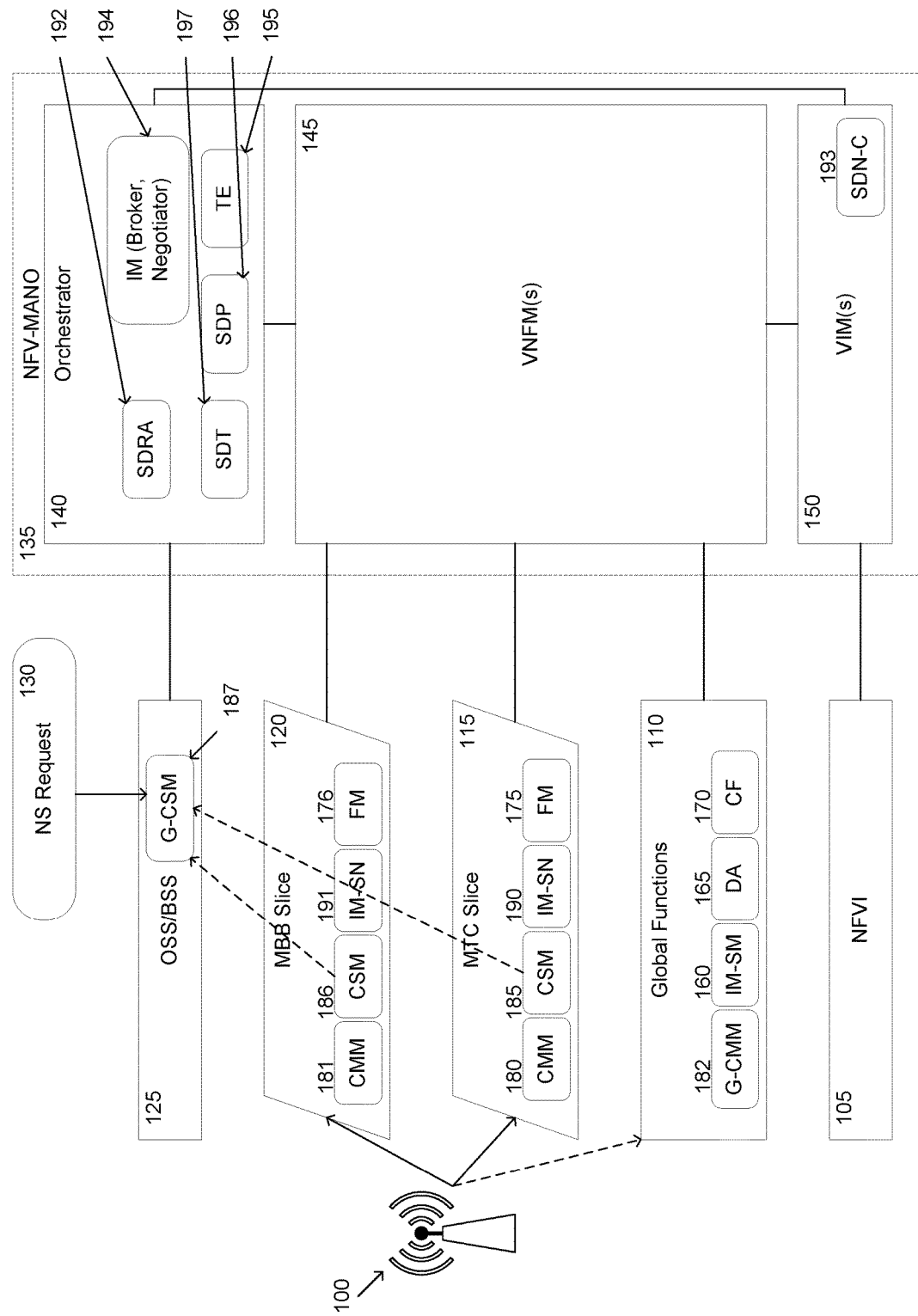
FIG. 1 illustrates an overview of a communication network architecture of a network operator in accordance with embodiments of the present invention.

As used herein, a "network" or "communication network" may service various devices including but not necessarily limited to wireless devices. Such a network may include a radio access portion and backhaul portion. The network may further comprise various virtualized components as will become readily apparent herein. A primary example of such a network is 5G network which is reconfigurable and capable of network slicing, as described below.

Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers" a copy of which may be found at http://www.3gpp.org/DynaReport/22891.htm) is a collection of logical network functions that supports the communication service requirements of a particular network service. One use of network slicing is in the core network. Through the use of network slicing, different service providers can have distinct core networks that run on the same physical set of network and computing resources. Network slicing can also be used to create independent virtual networks dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In a conventional mobile network, a device is associated with a Mobility Management Entity (MME) during the attach process. The MME associated with the mobile device is selected from a pool of MMEs by a selection function in a network infrastructure component. In contrast with a network having a single network that must be designed to meet the needs of each wireless device, network slicing allows the instantiation of separate network slices on the physical network resources. Each of the slices can be created so that it has characteristics directed towards the particular requirements of each of the different network services. The use of network slices allows for the separation of different types of traffic, which each may have different packet processing requirements and QoS requirements. Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

The Network Function Virtualization (NFV) framework can be used to define a plurality of virtual network functions (VNFs), each of which can correspond to a function enabling operation of a communication network. For example a VNF can provide the functions of a router, switch, gateway, firewall, load balancer, server and the like. The function is virtualized in the sense that it may utilize a set of virtual resources, such as computing, storage and networking resources, rather than utilizing dedicated hardware resources. As such, VNFs may be instantiated on an as-needed basis using available virtual resources. NFV and virtual network functions architecture is described in ETSI GS NFV 001 entitled "Network Function Virtualization (NFV); Use Cases", October 2013 and ETSI GS NFV 002 entitled "Network Function Virtualization (NFV); Architectural Framework", October 2013, for example.

To provide context to aid in the understanding of network slicing, and the concept of a network slice, it is helpful to understand that in heterogeneous networks in addition to a plurality of different types of nodes covering different locations, different infrastructure providers may own different parts of what is considered as an access network (or even parts of a core network). A Telecommunications Service Provider (TCSP), who provides service to a final customer, such as an M2M virtual network operator (VNO) (which may also be referred to as an M2M SP) or another virtual service provider, may wish to provide a simple network to the M2M SP. As such, the TCSP will create a virtual network having virtual nodes and virtual links between the nodes. The M2M SP only needs to interact with the virtual network (VN) resources and operates as a VNO. However, the VN (both nodes and links) need to be mapped to physical infrastructure. The VN may only use a subset of the physical nodes, and each physical node that the VN uses may not be fully used by that VN. It should also be understood that the M2M SP may make use of more than one TCSP, allowing it to create a network formed from a plurality of slices across different networks, effectively having a network slice that is a superset of the resources of a single TCSP. If certain bandwidth requirements are set for each logical link, then percentages of physical links are allocated to create the virtual link. This may also include aggregating links to create a logical link of greater capacity than a single physical link. Network slices are the collection of the allocation of the resources in what may be different networks. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The M2M SP may typically be unaware of the changes in the infrastructure.

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements. Configuration of the network slices may be based on software defined networking, network function virtualization and network orchestration.

According to embodiments of the present invention, there is provided a system and a method for the requesting and provisioning of network resources including infrastructure resources, spectrum resources or both, between network domains. Infrastructure resources can include core network resources or radio access network (RAN) resources, or both. For example infrastructure resources can include data centre resources, core bandwidth resources, computing resources, storage resources, networking resources and the like. The instant application is directed to the "sharing" of resources between network domains. The provision and distribution of the infrastructure and spectrum resources can be provided substantially in real time. Infrastructure resource and spectrum resource requirements can be determined and if additional resources are required, requesting the required resources from another network domain can be performed, thereby attempting to substantially provide the desired level of performance, while mitigating the need for expansion of the resources which are "owned" by a particular network domain. The real time provision of infrastructure and spectrum resources between network domains can be enabled by interaction between Negotiator and Broker functions operatively associated with the communication networks of each of the network domains. In some embodiments, the Broker and Negotiator functions for a particular network domain are instantiated within a Management and Orchestration (MANO) entity associated with the communication network for that network domain. In some embodiments, the Broker and Negotiator functions for each of the network domains are communicatively linked to the respective MANO, and instantiated within another node of the respective communication network.

In some embodiments a method for managing network resources includes receiving a network service request with a first network domain and determining whether there are sufficient resources to perform the network service request with the first network domain. In some embodiments, if there are insufficient resources, the method further includes borrowing network resources from a second network domain to provision the network service request.

According to embodiments, a network domain can be representative of a particular network operator or may be representative of a subset of a network operator or may be a superset of network operators or the like as would be readily understood.

In order to provide context, according to embodiments of the present invention, a communication network architecture including a system for virtual infrastructure management between operator networks, is based on a Network Function Virtualization (NFV) framework. The NFV Management and Orchestration (MANO) entity is used to instantiate the necessary network functional components in order to suitably provide the service indentified by a Network Service (NS) request. The instantiation of a network service request is described by a Virtual Network Function Forwarding Graph (VNFFG) which defines the set of network functions that are required to provide the requested service. The VNFFG contains a Network Forwarding Path (NFP) that defines a sequence of actions that are to be performed, for example by a collection of VNFs, to provide the requested service.

FIG. 1 illustrates an overview of a communication network architecture for a particular operator network in accordance with embodiments of the present invention. The NFV-MANO entity 135 includes an Orchestrator function 140, a Virtual Network Function Manager (VNFM) function 145 and a Virtual Infrastructure Manager (VIM) function 150. According to embodiments, the functionality of the Orchestrator function 140, VNFM function 145 and VIM function 150 can be as defined in ETSI GS NFV 001 and ETSI GS NFV 002, for example.

According to embodiments, the VIM function 150 is configured to manage the Network Function Virtual Infrastructure (NFVI) 105 which can include physical infrastructure, virtual resources and software resources in a NFV environment. For example physical infrastructure can include servers, storage devices and the like and virtual resources can include virtual machines. According to embodiments, there can be a plurality of VIM functions instantiated within a particular NFV-based network, wherein each VIM function is responsible for the management of its respective NFVI.

According to embodiments, the VNFM function 145 can be configured to manage the Virtual Network Functions (VNF) and can manage the lifecycle of the VNFs. For example the VNFM function 145 can create, maintain and terminate VNF instances, which can be installed on virtual machines that are created and managed by the VIM function 150. The VNFM function 145 can also be configured to provide fault, configuration, accounting, performance and security management (FCAPs) of the VNFs. In addition, the VNFM function 145 can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

According to embodiments the Orchestrator function 140 can be configured to coordinate, authorize, release and engage the NFVI resources by interaction with the VIM function 150. The Orchestrator function 140 further is configured to create end to end service between different VNFs by interaction with the VNFM function 145.

With further reference to FIG. 1, a plurality of network slices and a Global Control Plane 110 used for network slice management in accordance with embodiments of the present invention is illustrated. The Global Control Plane 110 controls functions across multiple and potentially all the network slices. The Global Control Plane 110 may be regarded as a separate network slice in some embodiments. The illustrated network slices include at least one Mobile Broadband (MBB) network slice 120 and at least one Machine Type Communication (MTC) network slice 115, although other types of network slices may be provided.

In various embodiments, both the Global Control Plane functions and the network slice specific control planes functions may be instantiated at an arbitrary location in the network by the NFV-MANO entity in order to provide connection management across a plurality or all of the network slices. The location of these functions may depend on performance factors such as delay requirements of different network services being provided.

The functions configured within the Global Control Plane 110 can include the Global Connection and Mobility Management (G-CMM) function 182, Infrastructure Management (IM) function which can contain a broker function and a negotiator function for obtaining computing, storage and network resources for core network functions. In some embodiments the IM function contains a Spectrum Manager (IM-SM) function 160 which is configured to obtain spectrum resources which may be resources that can be used by the particular operator network but can be obtained from one or more other operator networks. The Global Control Plane 110 can also include a Data Analytics (DA) function 165 and Cache and Forwarding (CF) function 170.

In more detail, the G-CMM function 182 is responsible for maintaining a list of the instantiated network slices and the parameters associated with each network slice (e.g. Operator ID, service type, etc.). The G-CMM function 182 is further responsible for maintaining a pool of Connection and Mobility Management (CMM) functions, wherein each CMM function is instantiated as a local or network slice specific function. The G-CMM function 182 is further responsible for initial association to a network slice.

When implemented, a Data Analytics (DA) function 165 can be assigned responsibility for collecting statistics across multiple and potentially all network slices. These statistics and data collected can be used in order to manage, evaluate operation conditions and the like or a combination thereof, for each of the network slices.

The Cache and Forward (CF) function 170 is responsible for management of the cached content across multiple and potentially all network slices.

In embodiments, the network architecture further includes a Global Customer Service Management (G-CSM) function 187 which is configured to receive the Network Service (NS) Requests 130 and act upon same through communication with the Orchestrator function 140 of the NFV-MANO entity 135. The G-CSM function 187 is responsible for maintaining a pool of Customer Service Management (CSM) functions, wherein each CSM function is instantiated as a local or network slice specific function, for example CSM 185, 186 respectively instantiated on the MBB network slice and the MTC network slice. The G-CSM function 187 is further responsible for keeping track of charging, for example billing, across multiple or potentially all network slices. The G-CSM function 187 can be configured to monitor network slices and provide feedback to the Orchestrator function 140 about the performance of a network slice thereby enabling optional fine tuning of the network and computing resources, as managed by the VNFM function 145 and the VIM function 150. The fine tuning can provide for the substantial optimization of the operation of the respective network slices in terms of, for example, computing resource usage.

In some embodiments, the G-CSM function 187 can be integrated within the Operational Support System/Business Support System (OSS-BSS) 125. The OSS can include functions that support back-office activities which aid in operating a communication network, as well as provision and maintain customer services and the like. The BSS can include functions that support customer-facing activities, for example billing order management, customer relationship management, call centre automation and the like. In this embodiment, the G-CSM function 187 can communicate with the Orchestrator function 140 using the Os-Ma-nfvo interface, which provides communication between the OSS/BSS 125 and the Orchestrator function 140.

In other embodiments, the G-CSM function 187 can be instantiated within the network but external to the OSS/BSS 125. In this configuration, another interface, which is not defined with the NFV framework, is configured in order to provide communication between the G-CSM function 187 and the Orchestrator function 140.

With further reference to FIG. 1, the various network slices, for example the MBB slice 120 and MTC slice 115, may each include their own network slice specific Connection and Mobility Management (CMM) function 181, 180 and Customer Service Management (CSM) function 186, 185, and additionally may be managed by the Global Control Plane 110. The network slice specific CMM functions 181, 180 are referred to and controlled by the G-CMM function 182 operating within the Global Control Plane 110. Each network slice further includes a Flow Management (FM)/Traffic Engineering (TE) function 176, 175 which can be configured to tune the performance of the network slice by dynamically analyzing, predicting and regulating behaviour of data transmitted over that network slice. In addition, each of the network slices further includes an Authentication and Authorization (AA) function, which may provide authorization of access of a UE to use of the communication resources of the particular network slice.

In some embodiments, each network slice further includes a network slice specific Infrastructure Management function containing a Spectrum Negotiator function (IM-SN) 191, 190. In some embodiments, the IM-SN function is not contained within the network slice but instead resides within the Cloud Radio Access Network (C-RAN) functions.

Although only a single Access Node 100 is shown for clarity and illustrated by the "tower icon", it will be readily understood that multiple Access Nodes are supported. In embodiments, an Access Node throughout the various figures may correspond to one or more Remote Radio Units (RRUs) operatively coupled to one or more Baseband Units (BBUs) or the like.

In accordance with embodiments of the present invention, the NFV-MANO entity 135 further instantiate NFV management plane functions that are used to define the network topology for a Network Service (NS) request; determine the transport protocols to be used across links; and determine the physical links between different network functions used by the network service. In some embodiments, these NFV management plane functions are integrated within the Orchestrator function 140 and include a Software Defined Topology (SDT) function 197, a Software Defined Protocol (SDP) function 196, a Software Defined Resource Allocation (SDRA) function 192 and an Infrastructure Manager (IM) function 194.

SDN is a network management technique that allows a network management entity (e.g. an SDN Controller) to implement an architectural framework to create intelligent programmable networks, where the control planes and the data planes can be decoupled, network intelligence and state are logically centralized, and the underlying network infrastructure is abstracted from the application. In embodiments of the present invention, the Orchestrator function may use customer information and provide information to form a network logical topology, for example as created via the Software Defined Topology (SDT) function. The SDT function can be combined with the SDN and Software Defined Protocol (SDP) function to create a customized virtual network, wherein a virtual network is a collection of resources virtualized for a particular service.

According to embodiments, the SDT function 197 is instantiated as part of the Orchestrator function 140. The SDT function 197 is configured to determine the Point of Presence (PoP) for each VNF in the VNF Forwarding Graph (VNFFG) provided by the G-CSM function 187. The SDT function 197 is also configured to determine the logical links between the VNFs in the VNFFG.

According to embodiments, the SDRA function is configured to allocate physical link resources for each logical link defined in the VNFFG. The SDRA function may rely upon other functional components, such as the SDN Controller (SDN-C) function 193 and the Traffic Engineering (TE) function 195. The SDN-C function 193 is instantiated within each VIM function 193 and is configured to provide the forwarding rules to the forwarding switches, for example routers and the like within the physical network architecture. The TE function 195 is instantiated within the Orchestrator function 140 and is configured to perform path computation between the source node and destination node while attempting to tune the path by dynamically analyzing, predicting and regulating behaviour of data transmission.

According to embodiments, the SDP function 196 is instantiated as part of the Orchestrator function 140. The SDP function 196 is configured to determine the transport protocol stack for each of the logical links defined in the VNFFG.

Having further regard to FIG. 1, the Infrastructure Manager (IM) function 194 includes both a Negotiator function and a Broker function, which are responsible for brokering and negotiating for additional network infrastructure and spectrum resources on behalf of one network operator with compatible Negotiator and Broker functions of another network operator, as will be further discussed elsewhere herein. It would be understood that while FIG. 1 illustrates the Negotiator and Broker functions as being instantiated within the MANO of the communication network of a particular network operator, the Broker and Negotiator functions may equally be instantiated within another node outside of the MANO.

Figure 2:
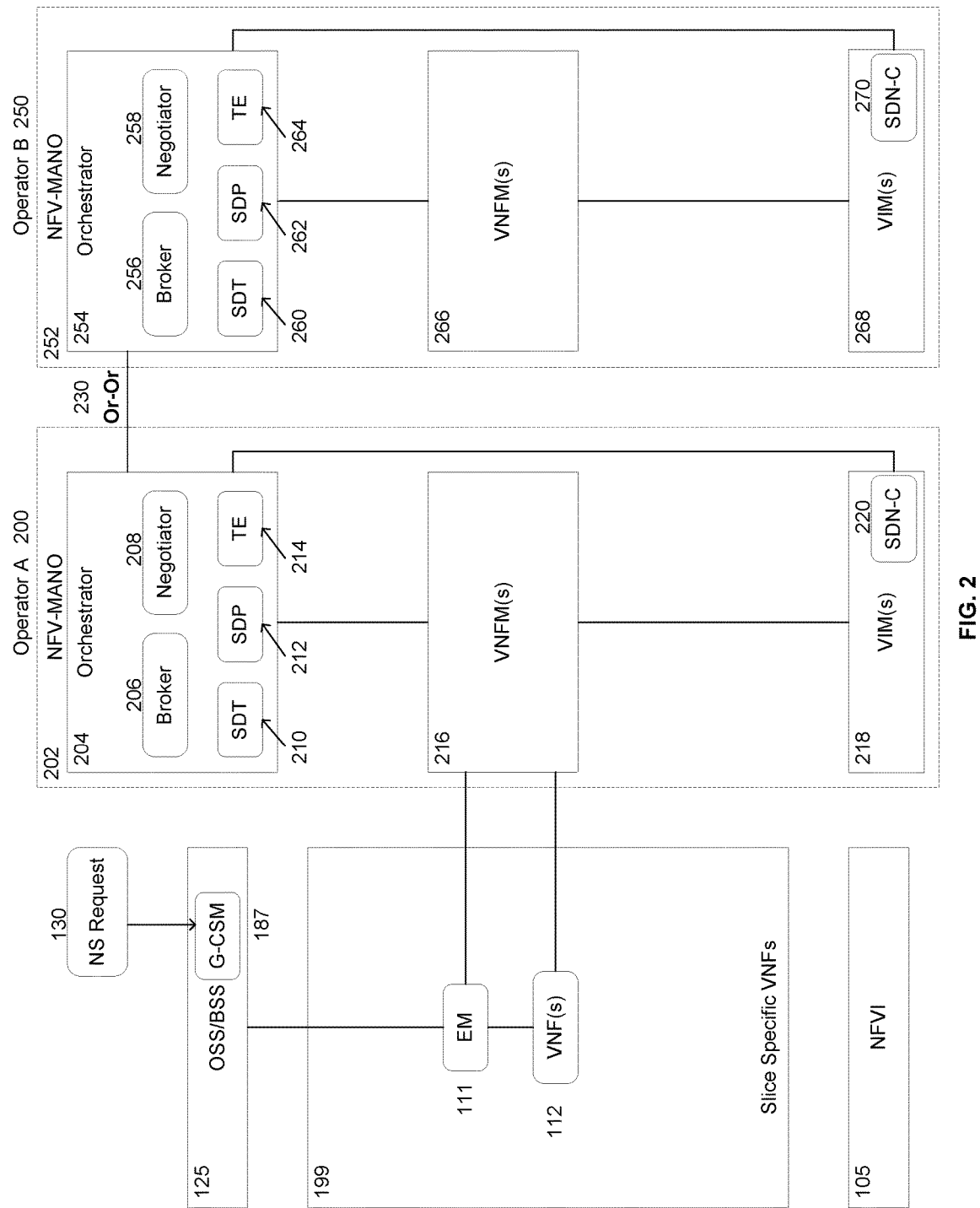
FIG. 2 illustrates a system for virtual infrastructure management including first and second Operators having internal Infrastructure Management functions in accordance with embodiments of the present invention.

Having discussed an overview of a communication architecture to which the infrastructure management system can be applied, FIG. 2 illustrates a system for virtual infrastructure management between operator networks, according to embodiments of the present invention. The system comprises an Operational Support System/Business Support System (OSS/BSS) 125 function, one or more Slice Specific Virtual Network Functions (SSVNFs) 199, a Network Function Virtualization Infrastructure (NFVI) 105, a first NFV-MANO 202 entity, and a second NFV-MANO 252 entity.

As shown in FIG. 2, the first NFV-MANO 202 entity corresponds to a first operator (Operator A) 200 and comprises a first Orchestrator function 204, one or more Virtual Network Function Managers (VNFM(s)) 216, and one or more Virtual Infrastructure Managers (VIM(s)) 218. The Orchestrator function 204 further comprises a Broker 206 function, a Negotiator 208 function, a Software Defined Topology (SDT) 210 function, a Software Defined Protocol (SDP) 212 function, and a Traffic Engineering (TE) 214 function. The VIMs 218 further comprise a Software Defined Network Controller (SDN-C) 220 function. The Orchestrator 204 function is communicatively coupled to the G-CSM 187 of the OSS/BSS 125, while the VNFM(s) 216 are communicatively coupled to the Element Manager (EM) 111 and VNFs 112 of the SSVNF(s) 199, while the VIM(s) 218 are communicatively coupled to the NFVI 105. The functionality of the Orchestrator 204, VNFM 216, VIM 218 and EM 111 functions may be defined in ETSI GS NFV 001 and ETSI GS NFV 002, for example.

Still referring to FIG. 2, the second NFV-MANO 252 entity corresponds to a second operator (Operator B) 250 and comprises the same functional elements as the first NFV-MANO entity, namely, a second Orchestrator 254 function, one or more Virtual Network Function Managers (VNFM(s)) 266, and one or more Virtual Infrastructure Managers (VIM(s)) 268. The second Orchestrator 254 function further comprises a Broker 256 function, a Negotiator 258 function, a Software Defined Topology (SDT) 260 function, a Software Defined Protocol (SDP) 262 function, and a Traffic Engineering (TE) 264 function. The VIM(s) 268 further comprise a Software Defined Network Controller (SDN-C) 270 function. The first and second NFV-MANOs 202, 252 are communicatively inter-coupled through their respective Orchestrators 204, 254, via the Orchestrator-Orchestrator interface (Or-Or) 230.

The system of FIG. 2 may be used for managing network resources, for example, when the first NFV-MANO 202 entity (Operator A 200) cannot satisfy a request for additional computing, storage, network resources and the like or a combination thereof. For example, when a link is congested and no new paths can be configured to resolve the congestion, or if there are insufficient network resources for a network function to perform a scale-up or scale-out operation. Accordingly, the first NFV-MANO 202 entity may communicate with the second NFV-MANO 252 entity in order to obtain additional infrastructure resources, spectrum resources or both.

In operation, the Global Customer Service Management (G-CSM) 187 function of the OSS/BSS 125 receives a request, such as a Network Service Request (NS Request) 130. The G-CSM 187 then determines whether the NS Request 130 can be accommodated on an existing network slice using the current (SSVNFs) 199 with or without modification, or whether a new network slice is required. This determination is then sent to the first Orchestrator 204 function and the Orchestrator 204 function proceeds to instantiate each necessary function for provision of the NS Request 130 by creating a new network slice (i.e. instantiating an new set of SSVNFs) or adding necessary functions to an existing network slice (SSVNF). Those skilled in the art will appreciate that the trigger for determining whether more resources are required can originate with an EM 111 in response to performance measurements of the VNFs 112 for which the EM 111 is managing operation. These measurements can be sent to the OSS/BSS 125 where a function similar to that described above can be triggered. This can result in new requests being assigned to a new slice, or an existing service being migrated to its own slice. The OSS/BSS 125 can, upon determining that additional infrastructure, spectrum or both resources are required, can inform the Orchestrator 204 of the first Operator 200. The Orchestrator 204 can then negotiate with the Orchestrator 254 of the second Operator 250 for the required resources that will allow a scale up or scale out. This provision of the required resources by the second Operator 250 can enable the provision of suitable network resources by the first Operator 200 to accommodate the NS Request 130.

Each SSVNF comprises an Element Manager (EM) 111 and Virtual Network Functions (VNFs) 112, wherein the EM 111 functions to evaluate the services in the NS Request 130 and determine whether there are sufficient resources to carry out the requested services. If there are insufficient resources, the SSVNF 199 may send a trigger to the first NFV-MANO 204 entity to request additional resources. In certain embodiments, the NFVI 105 may also determine whether there are sufficient resources, and may send a trigger to the first NFV-MANO 204 entity if more resources are needed.

The first Orchestrator function of the first NFV-MANO entity can receive the trigger through a variety of possible routes including: i) from the VNFs or EM of the SSVNF via the OSS/BSS; ii) from the VNF of the SSVNF via the VNFMs of the first NFV-MANO entity; and iii) from the NFVI via the VIMs of the first NFV-MANO entity. Triggers initiated by the VNFs of SSVNF may be based on performance metrics measured by the VNF. If the first Orchestrator function determines that there are insufficient resources to grant the request, the first Orchestrator function may send a request to the second Orchestrator function of the second NFV-MANO entity. The request may be sent from the Negotiator 208 of the first Orchestrator function, to the Broker 256 of the second Orchestrator function via the Or-Or interface 230.

Figure 3:
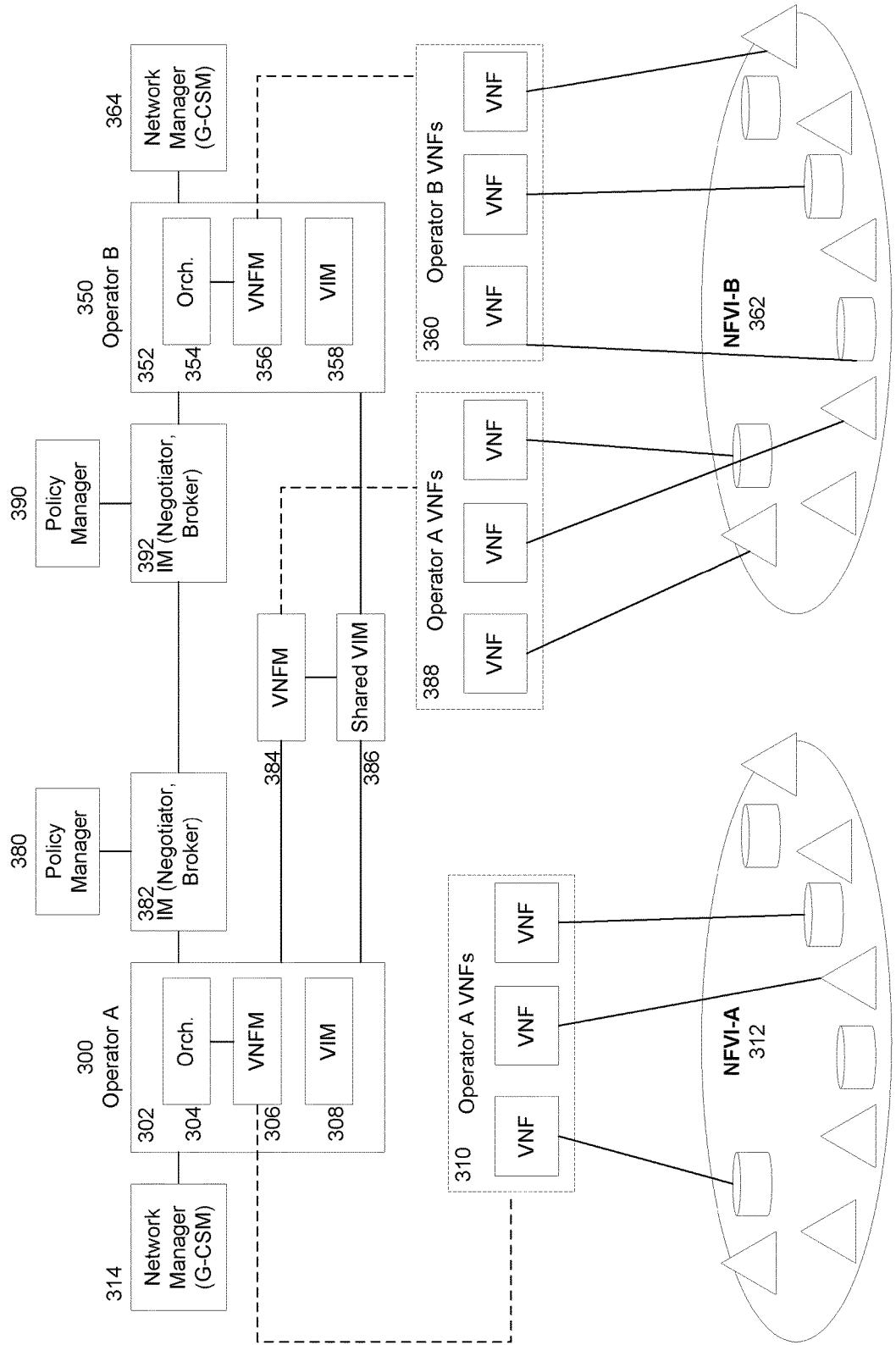
FIG. 3 illustrates a system for virtual infrastructure management including external Infrastructure Management functions in accordance with embodiments of the present invention.

Referring to FIG. 3 there is shown an alternate system for virtual infrastructure management, according to embodiments of the present invention. It should be noted that this embodiment requires the definition of a new interface, which is currently not defined in ETSI GS NFV 001 and 002, for communication between the respective IM (Negotiator, Broker) 382, 392 functions of the respective network Operators 300, 390. The system comprises a first NFV-MANO 302 entity corresponding to a first operator (Operator A) 300, and a second NFV-MANO 352 entity corresponding to a second operator (Operator B) 350. The first and second NFV-MANO 302, 352 entities each further comprise first and second Orchestrator functions 304, 354, VNFM 306, 356 functions, and VIM 308, 358 functions, respectively. Each NFV-MANO entity is communicatively connected to respective Network Manager 314, 364 functions, Policy Manager 380, 390 functions, and Infrastructure Management (IM) 382, 392 functions. Each of the IM 382, 392 functions include Broker and Negotiator functions instantiated outside of the respective Orchestrator 304, 354 function. The IM 382, 392 functions may be instantiated and managed by their respective infrastructure owners (for example, Operator A 300 or Operator B 350). This is in contrast to the system of FIG. 2, where the Broker and Negotiator functions are internal to their respective Orchestrator function. The VIMs 308, 358 of the first and second NFV-MANO 302, 352 entities are communicatively intercoupled via a Shared VIM 386. Additionally, each VNFM 306, 356 of the first and second NFV-MANOs 302, 352 are communicatively coupled to respective Operator VNFs 310, 360, each of which comprise VNF's for performing functions over first and second Network Function Virtualization Infrastructures (NFVI-A 312, NFVI-B 362).

In this illustrated embodiment, Operator A 300 is requesting and has been allocated infrastructure from Operator B 350. This is illustrated by the independent VNFM 384 which is communicatively coupled between the first NFV-MANO 302 (Operator A 300) and Operator A VNFs 388 for performing functions over NFVI-B 362.

In an instance where Operator B 350 is requesting and has been allocated infrastructure from Operator A 300, the independent VNFM would be communicatively coupled between the second NFV-MANO and Operator B VNFs for performing functions over NFVI-A.

According to embodiments, the Broker/Negotiator operatively associated with a first communication network, for example the communication network of Operator A, can be instantiated within the Orchestrator of the first communication network as shown in FIG. 2. And the Broker/Negotiator operatively associated with a second communication network, for example the communication network of Operator B, can be instantiated outside of the Orchestrator of the second communication network as shown in FIG. 3.

The system of FIG. 3 may be used for managing network resources in a variety of different ways, examples of which are described further below. It will also be understood that these examples may also apply to the architecture illustrated in FIG. 2.

In some embodiments, Operator A and Operator B have respective NFV-MANO entities (eg. first NFV-MANO and second NFV-MANO, respectively). The first or second NFV-MANO entity may receive a NS request, for example, through a respective Network Manager function (e.g. G-CSM). If the respective Orchestrator function of the NFV-MANO entity determines that there are insufficient internal resources to fulfill the request, the NFV-MANO may request to borrow infrastructure from a $3^{rd}$ party, for example another Operator.

In some embodiments, Operator A and Operator B have respective NFV-MANO entities (eg. first NFV-MANO and second NFV-MANO, respectively). The first NFV-MANO entity may receive a NS request, for example, through a Network Manager function (e.g. G-CSM). If the first Orchestrator function of the first NFV-MANO entity (corresponding to Operator A) determines there are insufficient internal resources to fulfill the NS request, it may request to borrow infrastructure from Operator B. Operator B would then provide the requested networking resources and Operator A could manage the VNFs associated with the requested network resources.

In some embodiments, there is a single NFV-MANO entity which corresponds to Operator A. The NFV-MANO entity may receive a NS request, for example, through a Network Manager function (e.g. G-CSM). If the Orchestrator function of the NFV-MANO entity determines there are insufficient internal resources to fulfill the request, it sends a request for additional resources to the Orchestrator of Operator B.

Figure 4:
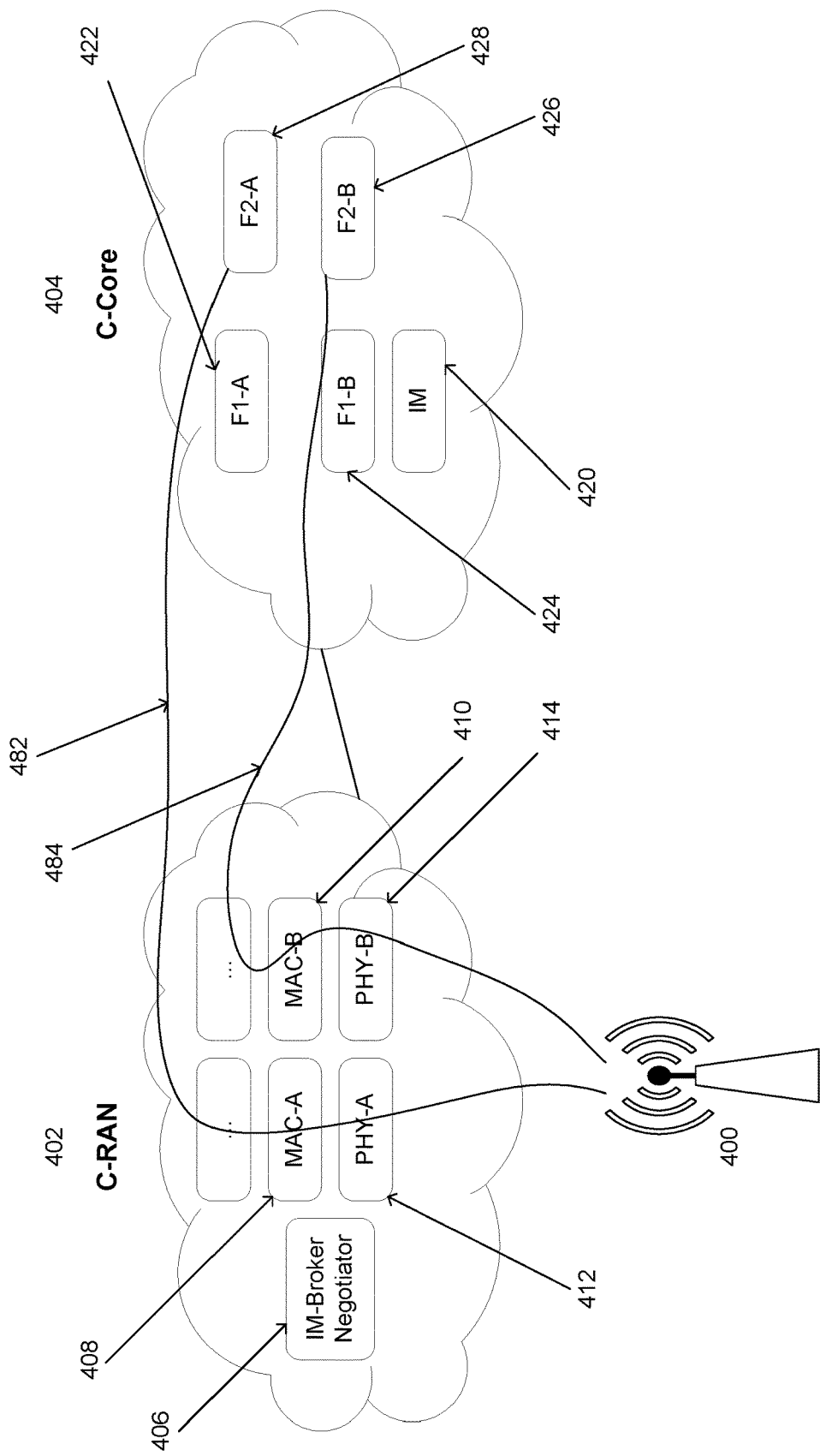
FIG. 4 is a functional diagram of a 3$^{rd}$ party infrastructure that may be used to obtain additional network resources in accordance with embodiments of the present invention.

Referring to FIG. 4, there is shown a functional diagram illustrating the IM 406, 420 functions for obtaining access resources and core network resources (compute, storage and networking) from multiple Operators, namely Operator A and Operator B, for provision of services to Access Point 400. In certain embodiments, this may comprise an Access Point owned by a $3^{rd}$ Party Operator, that is communicatively coupled via a wireless link to a Centralized Radio Access Network (C-RAN) 402, and a Centralized Core Network (C-Core) 404 the functionality of which is provided by multiple Operators. For example, in FIG. 4, there are two communication services from Access Point 400, namely services 482 and 484, wherein the use of the respective infrastructure and spectrum resources from the two Operators can be brokered and negotiated by the IM-Broker/Negotiator 406 associated with the respective Operator networks. As illustrated, service 482 functions on C-RAN 402 radio access protocol functions Medium Access Control function A 408 (MAC-A) and Physical Layer function A 412 (PHY-A), while the same service 482 functions on the C-Core via network functions F1-A 422 and F2-A 428. Each of MAC-A, PHY-A, F1-A and F2-A are provided by Operator A. Also as illustrated, service 484 functions on C-RAN 402 radio access protocol functions Medium Access Control function B 410 (MAC-B) and Physical Layer function B 414 (PHY-B), while the same service 484 functions on the C-Core via network functions F1-B 424 and F2-B 426. Each of MAC-B, PHY-B, F1-B and F2-B are provided by Operator B.

According to embodiments, spectrum resources may be shared between network operators, for example, using Time Division Multiplex (TDM), Frequency Division Multiplex (FDM), and Code Division Multiplex (CDM). When using TDM spectrum sharing, an entire carrier (frequency) may be used by the same operator for the duration allocated by the broker/negotiator. When using FDM spectrum sharing, the carrier may be sub-divided. For example, different operators may be allocated different portions of the carrier, and/or the broker/negotiator may dynamically change the amount of resources allocated to the different operators. When using CDM spectrum sharing, the carrier may be shared by allocating different codes to different operators.

Figure 5:
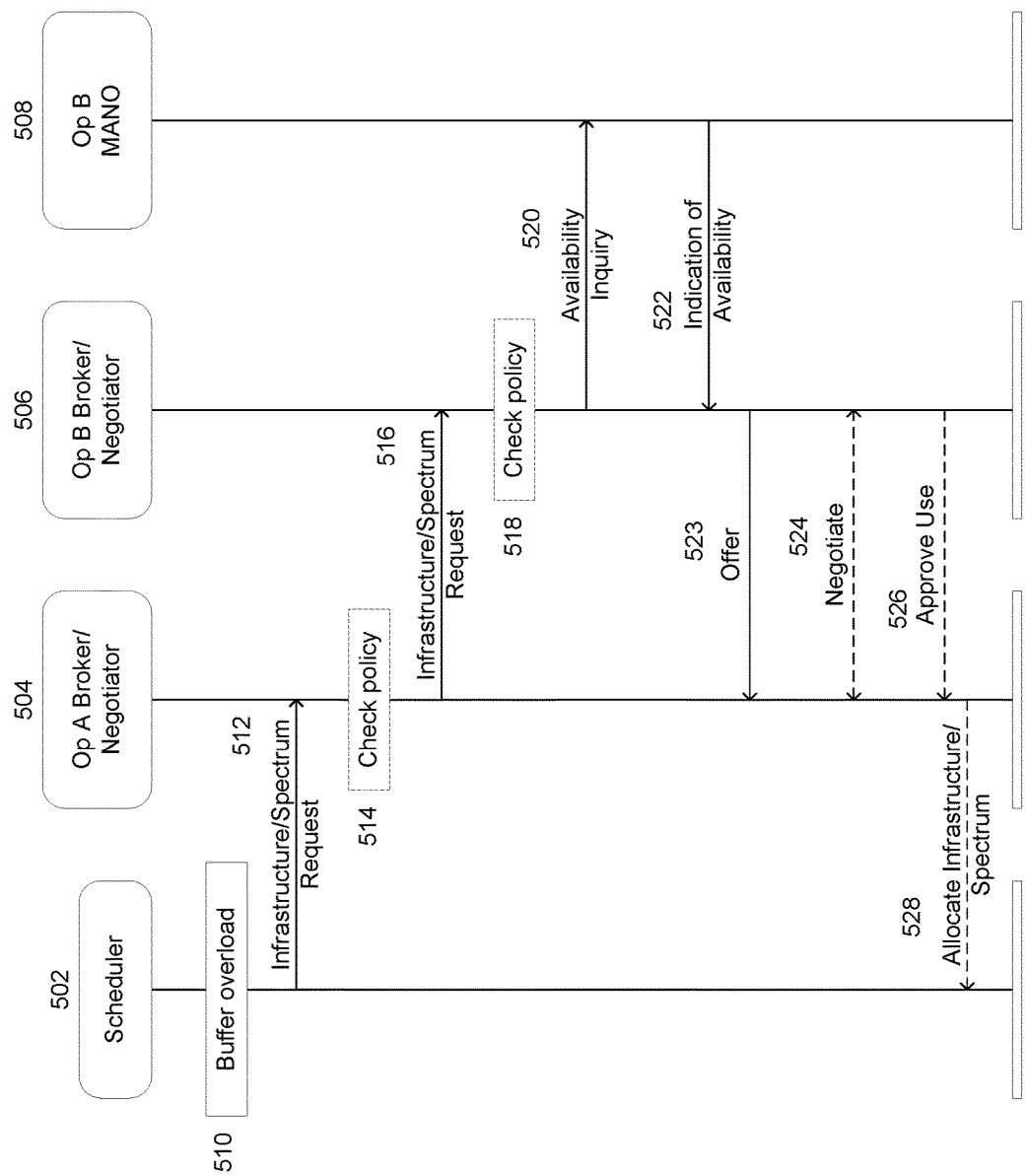
FIG. 5 illustrates a signalling flow chart illustrating a method for brokering and negotiating infrastructure/spectrum resources between network operators in accordance with embodiments of the present invention.

FIG. 5 illustrates a signalling flow chart illustrating a method for brokering and negotiating of infrastructure/spectrum resources between network domains in accordance with embodiments of the present invention. The signalling flow chart of FIG. 5 may be applied to one or more of the systems illustrated herein. The scheduler 502 associated with Domain A (Op A) determines that more infrastructure and or spectrum resources are needed. There are a number of different mechanisms that can be used to make this determination. As illustrated in FIG. 5, one such mechanism is that the scheduler 502 detects an overload of the allocated network infrastructure and/or spectrum resources. This may take the form of detecting a buffer overload 510, which may indicate that addition network infrastructure and/or spectrum is required. The scheduler 502 sends an infrastructure/spectrum request 512 to the Op A Broker/Negotiator function 504, for example via the G-CSM. In some embodiments, the Op A Broker/Negotiator function 504 can check a policy 514, for example a resource request policy, to determine if infrastructure/spectrum resource sharing between operators is enabled by this particular network operator. The Op A Broker/Negotiator 504 can proceed to send an infrastructure/spectrum request to the Op B Broker/Negotiator function 506 of Domain B, for example if the policy permits infrastructure/spectrum resource sharing between domains. For example, with reference to FIG. 2, this request between the Op A Broker/Negotiator can be sent via the Or-Or interface 230 communicatively linking the respective Orchestrators, namely Orchestrator 204 and Orchestrator 254.

With further reference to FIG. 5, in some embodiments, upon receipt of a request for infrastructure and/or spectrum resources, the Op B Broker/Negotiator function 506 can check a policy 518, for example a resource sharing policy, to determine if infrastructure/spectrum resource sharing between operators is enable by this particular network operator, or to check if this network operator has an existing relationship with the requesting network operator or the like or combination thereof. The Op B Broker/Negotiator 506 can proceed to send an infrastructure/spectrum resource availability inquiry 520 to Op B MANO 508 in order to determine if at least some of the requested infrastructure and/or spectrum resources are available for use. For example, the Op B MANO can query the G-CSM of communication network of operator B, in order to obtain an indication of available resources that may be available. This indication may be determined in light of current operational requirement of the communication network of Domain B. In some embodiments, determining an indication of available resources may be initiated if the policy permits infrastructure/spectrum resource sharing with requesting Domain A. Op B MANO 508 can subsequently send an indication 522 of the infrastructure and spectrum resources that are available to the Op B Broker/Negotiator 506. Op B Broker/Negotiator 506 can subsequently send an offer 523 to Op A Broker/Negotiator 504 to provide at least some of the infrastructure and/or spectrum resources that was requested by Domain A. In some embodiments, Op B Broker/Negotiator 506 can negotiate 524 with Op A Broker/Negotiator 504 in order that at least some of the requested infrastructure and/or spectrum resources can be provisioned by Operator B. Upon acceptance of the offer, or in some instances, completion of the negotiation, Op B Broker/Negotiator 506 may send an approval of use 526 of at least some of the requested infrastructure and/or spectrum resources to the Op A Broker/Negotiator 504. The Op A Broker/Negotiator 504 may subsequent allocate 528 the infrastructure and/or spectrum to the Scheduler 502 that had initially may the request.

It will be readily understood that while the Broker/Negotiator function has be described in a singular form in the above example, the Broker/Negotiator function can be formed from two separate functions, namely a Broker function and a Negotiator function. For example, for the network operator receiving the request, the Broker function operational thereon may perform the functions of determining and managing requests for additional infrastructure and/or spectrum resources from another network operator. For the network operator making the request, the Broker function operational thereon can be configured to provision the infrastructure and/or spectrum resources that are approved by the communication network receiving the request. In addition, the Negotiator functions may perform the function of negotiating on behalf of their respective network operators for obtaining or provisioning of infrastructure and/or spectrum resources.

In some embodiments, a Broker/Negotiator function of a particular network operator may be negotiating for infrastructure and/or spectrum based on a plurality of requests received from components within the communication network with which it is associated. For example, the Op A Broker/Negotiator may receive requests from multiple schedulers and these requests may be acted upon as a group during the negotiation process with Operator B, and the approved resources may subsequently be allocated to the schedulers to fulfill their respective requests. However, if the approved resources are not equivalent to the request resources, the Broker/Negotiator function can allocate the approved resources to the schedulers based on a set of criteria. These criteria may be based on priority, duration, communication type or the like or a combination thereof.

Figure 6:
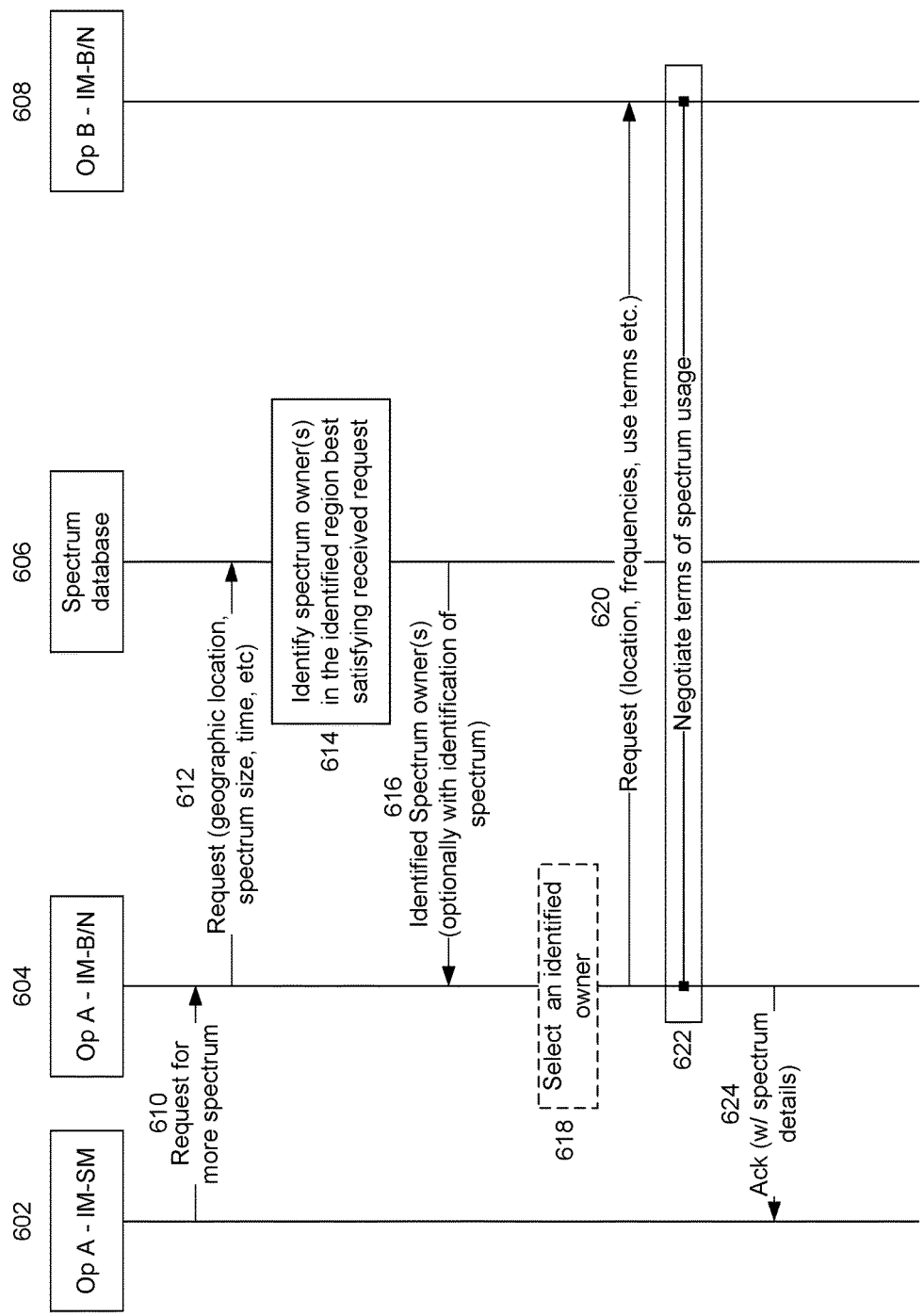
FIG. 6 illustrates a signalling flow chart illustrating a method for brokering and negotiating spectrum resources between network operators in accordance with embodiments of the present invention.

FIG. 6 illustrates a signalling flow chart illustrating a method for brokering and negotiating spectrum resources between network operators in accordance with embodiments of the present invention. The signalling flow chart of FIG. 6 may be applied to one or more of the systems illustrated herein. The Infrastructure Manager—Spectrum Manager (IM-SM) of Domain A (Op A) 602 identifies a need for additional spectrum by the communication network. Op A IM-SM 602 subsequently sends a request 610 for more spectrum to the IM-Broker/Negotiator 604 associated with the communication network of Domain A. Op A IM-B/N subsequently send a request 612 to a spectrum database 606, wherein the request can include one or more identifiers that relate to the requested spectrum. The identifiers can include details relating the geographic location where the requested additional spectrum is required, the size of requested additional spectrum, the duration of use of the requested additional spectrum or the like or combinations thereof. The spectrum database 606 includes information indicative of one or more spectrum owners which may be amenable to the "sharing" of their spectrum to network operators. The spectrum database 606 subsequently identifies 614 one or more spectrum owners that satisfies the received spectrum request. For example, the identification of the spectrum owner can be based on the identified geographic region, and the spectrum owner identified may be the one is in the identified region and best satisfies the one or more identifiers that relate to the spectrum request. The spectrum database 606 can send 616 details relating to the identified spectrum owners to the Op A IM-B/N 604. These details may include the identification of the spectrum that can be provided by the identified spectrum owner. Op A IM-B/N 604 subsequently sends 620 a request for the additional spectrum to the spectrum owner. In this example the spectrum owner is another network domain, namely Domain B (Op B), and as such Op A IM-B/N 604 sends the request Op B IM-B/N 608. The request may include parameters related to the requested additional spectrum which may be location, frequencies, terms of use or the like or a combination thereof. Op B IM-B/N 608 and Op A IM B/N 604 subsequently negotiate therebetween the terms of the requested additional spectrum. For example, terms can include quantity, frequencies costs, use time period or the like or combinations thereof. Upon the finalization of the negotiation for the additional spectrum, Op A IM-B/N 604 send 624 an acknowledgment to the Op A IM-SM that additional spectrum has been obtained. This acknowledgement can include details relating to the additional spectrum obtained or these details may be sent in a subsequent transmission.

It will be appreciated that during negotiations between the Negotiator functions of the network domains, for example negotiations between Domain A and Domain B, parameters indicative of duration, cost, coding and other features relating to the infrastructure and/or spectrum resources may negotiated.

According to embodiments, an indication of an overload of infrastructure and/or spectrum resources of a particular network operator can be one or more of a plurality of detectable conditions. For example an indication can be a detected overload at a buffer of a scheduler which provides for the scheduling and assignment of infrastructure/spectrum resources to particular communication transmissions. In some embodiments, transmissions to and from mobile devices served by a slice can have a predictable pattern. As an example, an MTC slice may serve MTC devices that generate predictable traffic at fixed intervals. Between these intervals, the resources allocated to the MTC slice may be constricted. In anticipation of a spike in traffic, the IM-SN in the MTC slice may request an increase in the spectrum allocation for a fixed period of time. Other predictably periodic spectrum needs will be understood by those skilled in the art. Other indications can include the transmission queue length, or other indication as would be readily understood by a worker skilled in the art. In some embodiments, it may be discovered that certain conditions, when observed, serve as predictors of increased network traffic. For example, when a v2x service receives an indication that there is an accident on a highway, there may be a related increase in the MBB slice traffic resulting from idled drivers using their mobile devices. This detection of an event may also serve as an indication that additional spectrum resources may be needed. In addition, the requirement of additional infrastructure/spectrum resources based on queue length can depend on the type of communication device being serviced. For example, latency of transmission for an MTC device may be of a lesser concern due to the type of information being transmitted over the communication network, and thus a longer queue length may be acceptable when compared to a queue length for a voice communication transmission. As such, an indication of an overload of infrastructure/spectrum resources may further be dependent on the type of network service request in question.

In some embodiments, the Broker function and Negotiator function may be applied to cover other types of Radio Access Technologies (RATs), for example, WiFi, unlicensed cellular frequency bands, and the like.

It will be readily understood that, throughout the preceding discussion, the above-described network function and their operation may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 7:
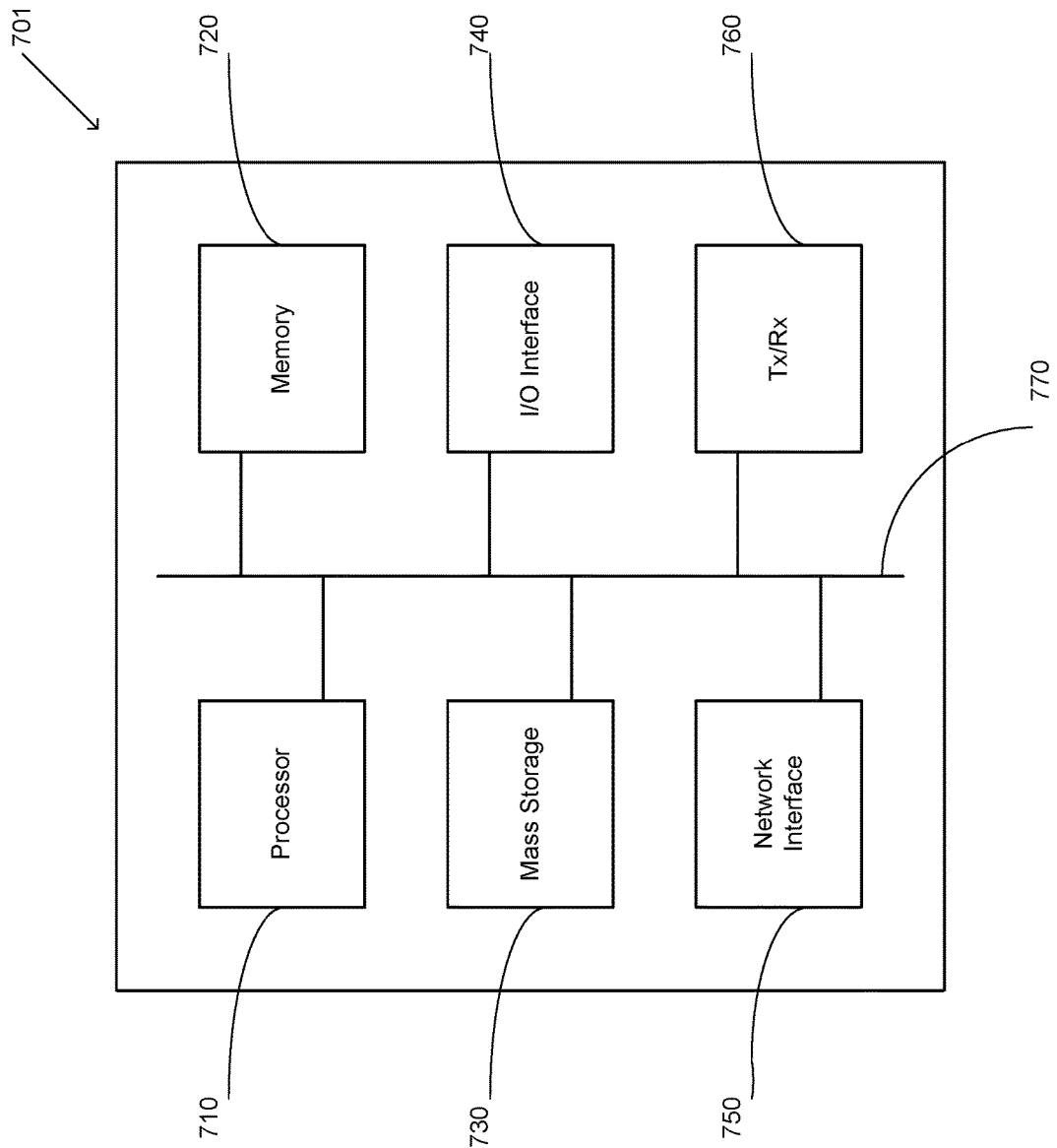
FIG. 7 illustrates a block diagram of a processing system that may be used for implementing the various network elements which instantiate a Broker function or a Negotiator function in accordance with embodiments of the present invention.

FIG. 7 is a block diagram of a processing system 701 that may be used for implementing the various network elements which instantiate the functions defined herein, for example a Broker function and a Negotiator function. As shown in FIG. 7, processing system 710 includes a processor 710, working memory 720, non-transitory storage 730, network interface, I/O interface 740, and depending on the node type, a transceiver 760, all of which are communicatively coupled via bi-directional bus 770.

According to certain embodiments, all of the depicted elements may be utilized, or only a subset of the elements. Further, the processing system 710 may contain multiple instances of certain elements, such as multiple processors, memories, or transceivers. Also, elements of processing system 710 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements an instructions executable by the processor for performing the aforementioned functions and steps of plural components defined above, for example, the Global Control Plane, the Spectrum Negotiator and the Spectrum Manager.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A method for virtual infrastructure management of network resources between a first communication network associated with a first network domain and a second communication network associated with a second network domain, the method comprising:
   receiving, at a resource broker in the first network domain, a request for additional network resources;
   transmitting, to a resource broker in the second network domain, the request for additional network resources; and
   receiving, in response to the transmitted request, an offer for at least some of the requested additional network resources;
   wherein a Management and Orchestration (MANO) entity operative on the first communication network creates and manages a set of virtual network functions (VNFs) associated with the requested additional network resources via a communicative coupling based on a shared Virtual Infrastructure Manager (VIM) in conjunction with a Virtual Network Function Manager (VNFM) associated with the MANO operative on the first communication network, the shared VIM intercoupling the MANO entity operative on the first communication network with a MANO entity operative on the second communication network.

2. The method according to claim 1, further comprising receiving an approval of use of at least some of the requested network resources.

3. The method according to claim 2, further comprising allocating the at least some of the requested network resources.

4. The method according to claim 1, further comprising checking a resource request policy in light of the request for additional network resources.

5. The method according to claim 1, wherein the additional network resources include one or a combination of spectrum resources, data centre resources, core bandwidth resources, computing resources, storage resources and networking resources.

6. The method according to claim 1, further comprising negotiating, by the resource broker of the first domain, with the resource broker of the second domain for provision of at least some of the requested additional network resources.

7. A method for virtual infrastructure management of network resources between a first communication network associated with a first network domain and a second communication network associated with a second network domain, the method comprising:
   receiving, at a resource broker in the second domain, a request for additional network resources from the first communication network;
   transmitting an inquiry in accordance with the request to determine availability of network resources;
   receiving an indication of the availability of network resources; and transmitting, in response to the received request, an offer for at least some of the requested additional network resources;

wherein a Management and Orchestration (MANO) entity operative on the first communication network creates and manages a set of virtual network functions (VNFs) associated with the requested additional network resources via a communicative coupling based on a shared Virtual Infrastructure Manager (VIM) in conjunction with a Virtual Network Function Manager (VNFM) associated with the MANO operative on the first communication network, the shared VIM intercoupling the MANO entity operative on the first communication network with a MANO entity operative on the second communication network.

8. The method according to claim 7, further comprising transmitting an approval of use of at least some of the requested network resources.

9. The method according to claim 7, further comprising checking a resource sharing policy in light of the request for additional network resources from the first communication network.

10. The method according to claim 7, further comprising negotiating, by the resource broker of the second domain, with the resource broker of the first domain for provision of at least some of the requested additional network resources.

11. A system for virtual infrastructure management of network resources between a first communication network associated with a first network domain and a second communication network associated with a second network domain, the system comprising:

a first broker/negotiator configured to transmit a request for additional network resources, the first broker/negotiator operatively connected with the first communication network; and a second broker/negotiator configured to receive and act upon the request from the first broker/negotiator to provision at least some of the requested additional network resources, the second broker/negotiator operatively connected with the second communication network and the at least some network resources associated the second communication network;

wherein a Management and Orchestration (MANO) entity operative on the first communication network creates and manages a set of virtual network functions (VNFs) associated with the requested additional network resources via a communicative coupling based on a shared Virtual Infrastructure Manager (VIM) in conjunction with a Virtual Network Function Manager (VNFM) associated with the MANO operative on the first communication network, the shared VIM intercoupling the MANO entity operative on the first communication network with a MANO entity operative on the second communication network.

12. The system according to claim 11, wherein the first broker/negotiator is instantiated within an Orchestrator associated with the first communication network.

13. The system according to claim 11, wherein the second broker/negotiator is instantiated within an Orchestrator associated with the second communication network.

14. The system according to claim 11, wherein the first broker/negotiator is instantiated outside of an Orchestrator associated with the first communication network.

15. The system according to claim 14, wherein the Virtual Network Function Manager (VNFM) is instantiated outside of the Orchestrator.

16. The system according to claim 15, wherein the VNFM is instantiated outside of the Orchestrator manages one or more Virtual Network Functions (VNF) instantiated using the at least some network resources associated with the second communication network.

17. The system according to claim 11, wherein the additional network resources include one or a combination of spectrum resources, data centre resources, core bandwidth resources, computing resources, storage resources and networking resources.

18. The system according to claim 11, wherein the first broker/negotiator and the second broker/negotiator are configured to negotiate the provision of at least some of the requested additional network resources.

19. The method according to claim 1, wherein the shared VIM intercoupling the MANO entity operative on the first communication network with the MANO entity operative on the second communication network allows the MANO operative on the first communication network to manage the at least some of the requested additional network resources offered.

20. The method according to claim 19, wherein to manage the at least some of the requested additional network resources offered, the MANO operative on the first communication network instantiates one or more of the set of VNFs associated with the requested additional network resources.

21. The method according to claim 20, wherein the one or more of the set of VNFs associated with the requested additional network resources are managed by the VNFM associated with the MANO operative on the first communication network.

22. The method according to claim 7, wherein the shared VIM intercoupling the MANO entity operative on the first communication network with the MANO entity operative on the second communication network allows the MANO operative on the first communication network to manage the at least some of the requested additional network resources offered.

23. The method according to claim 22, wherein to manage the at least some of the requested additional network resources offered, the MANO operative on the first communication network instantiates one or more of the set of VNFs associated with the requested additional network resources.

24. The method according to claim 23, wherein the one or more of the set of VNFs associated with the requested additional network resources are managed by the VNFM associated with the MANO operative on the first communication network.

25. The system according to claim 11, wherein the shared VIM intercoupling the MANO entity operative on the first communication network with the MANO entity operative on the second communication network allows the MANO operative on the first communication network to manage the at least some of the requested additional network resources offered.

26. The system according to claim 25, wherein to manage the at least some of the requested additional network resources offered, the MANO operative on the first communication network instantiates one or more of the set of VNFs associated with the requested additional network resources.

27. The system according to claim 26, wherein the one or more of the set of VNFs associated with the requested additional network resources are managed by the VNFM associated with the MANO operative on the first communication network.

* * * * *